United States Patent [19]

Hoopes

[11] 3,757,348
[45] Sept. 4, 1973

[54] MARKING SYSTEM FOR A STRIP CHART RECORDER

[75] Inventor: Howard Sherman Hoopes, Bucks County, Pa.

[73] Assignee: Leeds & Northrup Company, North Wales, Pa.

[22] Filed: Aug. 11, 1972

[21] Appl. No.: 279,833

[52] U.S. Cl. ............ 346/33 R, 346/74 ES, 346/101
[51] Int. Cl. ............................................. G01d 5/12
[58] Field of Search.............. 346/101, 33 EC, 33 B, 346/33 R, 74 E, 74 CH, 74 S, 74 SB, 74 SC, 74 ES

[56] References Cited
UNITED STATES PATENTS
2,560,256   7/1951   Shrader........................ 346/101 X Primary Examiner—Joseph W. Hartary
Attorney—Richard E. Kurtz

[57] ABSTRACT

In an analog recorder, a strip chart passes between a continuously rotating helical drum and a marking element extending parallel with the axis of drum rotation and perpendicular to the motion of the strip chart. During a first revolution of the drum, an analog input signal is applied to storage circuitry generating an output signal proportional to the magnitude of the input signal and the length of time the input signal is applied to the storage circuitry. During a second revolution of the drum, a reference signal is applied to the storage circuitry. When the output signal during the second revolution reaches a pre-determined level, the marking element is energized to produce a mark on the strip chart located at the junction of the helix on the drum and the marking element at that precise moment in time.

19 Claims, 6 Drawing Figures

3,757,348

MARKING SYSTEM FOR A STRIP CHART RECORDER

BACKGROUND OF THE INVENTION

1. Field of the Invention

This invention relates to analog strip chart recorders, and more particularly, to marking systems utilized in analog recorders of the helical drum type.

Helical drum recorders comprise a continuously rotating drum having a surface carrying a helical marking element which generally takes the form of a helix. An elongated marking member is provided which is located adjacent the drum and generally parallel with the drum axis. The strip chart is then passed between the drum and the elongated marking element in a direction perpendicular to the axis of drum rotation. Recording is accomplished by energizing the marking member at a time when the intersection of the helical marking element and the elongated marking member corresponds with the magnitude of the input signal being recorded.

2. The Prior Art

A helical drum recorder is disclosed in U.S. Pat. No. 2,560,256 — Shrader. As shown there, a capacitor is charged during the sweep of the helix past a marking member in the form of a movable printing bar. When a predetermined relationship is established between the input signal and the charge on the capacitor, the printing bar is actuated so as to create a mark on the strip chart representing the intersection of the printing bar and the helix at that precise point of time. All of the foregoing occurs during a single revolution of the drum.

In order to obtain a mark on the strip chart which accurately reflects the magnitude of the input signal, it is necessary to drive the helical drum at a constant speed while the relationship between the charge on the capacitor and the input signal is being determined. Providing a constant speed drive for the helical drum adds undesirable expense to a helical drum recorder.

SUMMARY OF THE INVENTION

It is a general object of this invention to reduce the cost of helical drum recorders.

It is a more specific object of this invention to eliminate the need for costly, constant speed drives in helical drum recorders.

It is a related specific object of this invention to eliminate critical time constants or requirements for precision devices in helical drum recorders.

In accordance with these and other objects of the invention, apparatus is provided for recording an analog input signal on a strip chart, the apparatus comprising a rotating drum having a helical element extending along the surface thereof concentric with the axis of drum rotation. As the strip chart moves between the drum and a marking means extending across the strip chart, the marking means is energized at an appropriate time so as to mark the strip chart in a position corresponding with the magnitude of the input signal applied to the recorder. The position of the mark is controlled by means providing periods of switch actuation which are synchronized with the rotation of the helical element past the marking means. During one period, one signal is generated representing a function of the input signal and the time elapsed during the one period. During another period, another signal is generated representing a function of the reference signal and the time elapsed during the other period. By terminating the earlier of the periods after a pre-determined angle of rotation and detecting when sufficient time has elapsed during the later of the periods so as to establish a pre-determined relationship between the one signal and the other signal and energizing the marking means when the pre-determined relationship has been established, the strip chart is marked in a position corresponding to the magnitude of the input signal.

In one preferred embodiment of the invention, a means for generating the signals representing the aforesaid functions comprises an integrating amplifier means where the input signal is applied to the integrating amplifier means during the earlier of the periods and the reference signal in the form of a constant DC voltage of opposite polarity is applied to the integrating amplifier means during the later period. By utilizing such an arrangement, the necessity for a constant speed drive is eliminated since the drive speed during the two periods will only have to be substantially constant where the two periods are adjacent in time.

In another embodiment of the invention, the means for generating the aforesaid functions comprise a counter which may be preset during the earlier period in response to the input signal as modified by an analog-to-digital converter. During the later period, the output of an oscillator of substantially constant frequency is applied to the counter. When the count reaches a pre-determined level, the marking means is energized. By utilizing the oscillator to drive the drum, the oscillator need not have an absolutely constant frequency and the necessity for a constant speed drum drive is again eliminated.

In still another embodiment of the invention, the means for generating the aforesaid functions comprises an up/down counter which is responsive to the input signal during the earlier period to count in one direction and responsive to the output of a reference oscillator during the later period to count in the opposite direction. The marking means is then energized when the count reaches a pre-determined level.

DETAILED DESCRIPTION OF PREFERRED EMBODIMENTS

Figure 1:
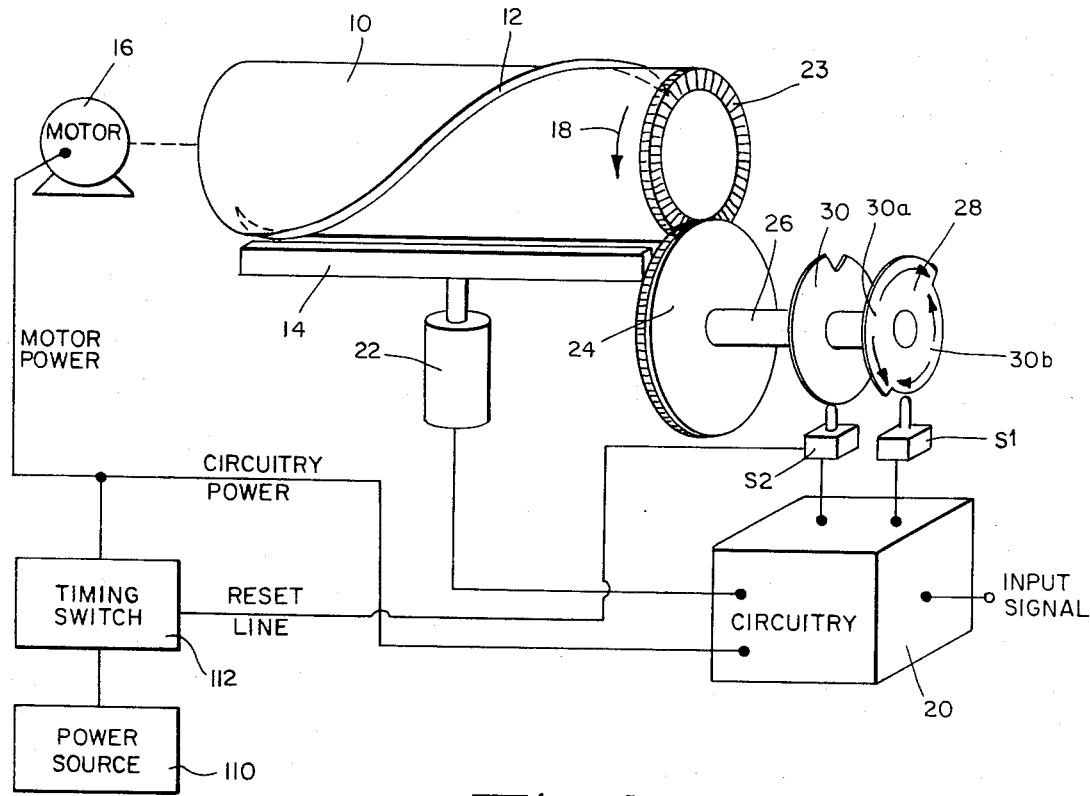
FIG. 1 is a perspective view of various components in a helical drum recorder.

A helical drum recorder is shown in FIG. 1 as comprising a drum 10 having a raised, helical marking element 12 extending along the surface of the drum concentric with the drum axis. The helical element 12 cooperates with a marking bar 14 located adjacent the surface of the drum 10 and extending substantially parallel with the axis of the helical marking element.

As a pressure-sensitive strip chart (not shown) passes between the drum 10 and the marking bar 14 with one side of the chart adjacent the helical element 12 and the other side adjacent the bar 14, the intersection of the helical element 12 and the marking bar 14 moves from left to right as the drum 10 is driven by a motor 16 with a direction of rotation indicated by an arrow 18. At the appropriate time which is a function of an analog input signal applied to circuitry 20, a marking solenoid 22 is energized such that the intersection of the helical element 12 and the marking bar 14 is appropriately spaced from the margin of the strip chart to accurately reflect the magnitude of the input signal.

Energization of the marking solenoid 22 at the appropriate time is controlled by the circuitry 20 and the electromechanical elements associated with the rotating drum 10. A gear 23 located at the end of the drum 10 meshes with a gear 24 having a 2:1 ratio with respect to the gear 23. Accordingly, for every two revolutions of the gear 23, the gear 24 passes through a single revolution. A shaft 26 couples the gear 24 to switching cams 28 and 30 associated with switches S1 and S2. As will now be described, the switching cams 28 and 30 and the associated switches S1 and S2 permit the input signal to be applied to the circuitry 20 for controlled periods of time to determine the magnitude of the input signal and energize the solenoid 22 accordingly.

Figure 2:
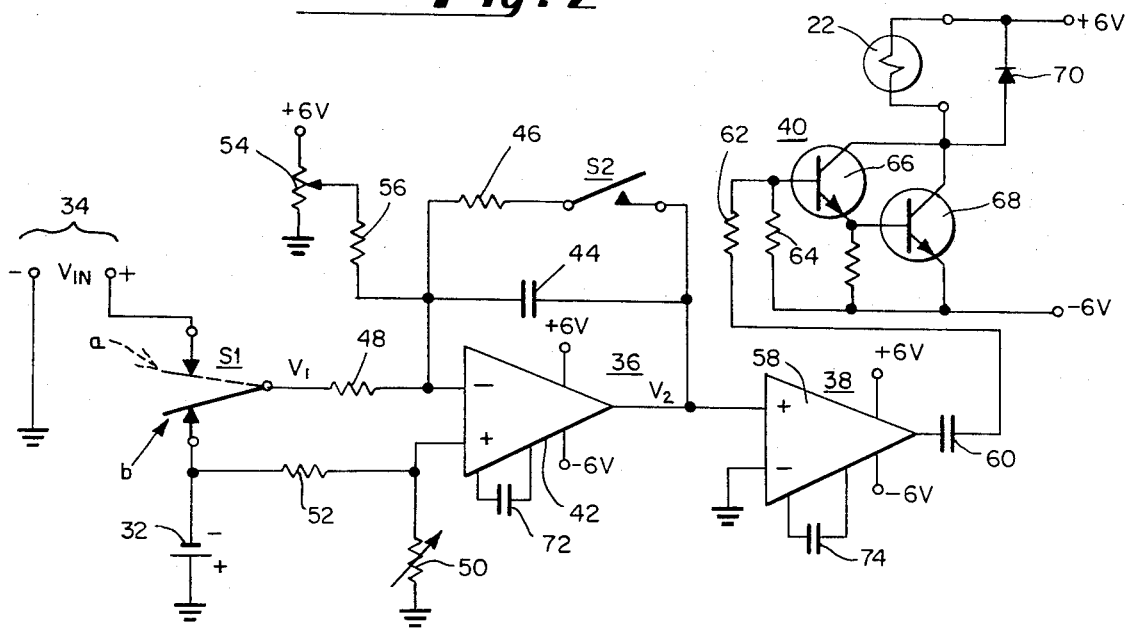
FIG. 2 is a schematic diagram of circuitry which is utilized in one embodiment of the invention.

Referring now to FIG. 2, it will be seen that the circuitry 20 includes a DC source 32 providing a DC reference voltage $V_{ref}$ and input terminals 34 for the input signal voltage, hereinafter referred to as voltage $V_{in}$. The voltage $V_{ref}$ and the voltage $V_{in}$ are alternately applied as a voltage $V_1$ to an integrating amplifier 36 including a capacitor 44 by means of the switch S1. During a first period of drum rotation corresponding to a first revolution of the drum, the amplifier output voltage $V_2$ represents a function of the voltage $V_{in}$ and the time elapsed during that period. During the second period of drum rotation substantially corresponding to a second revolution of the drum, the amplifier output signal represents a function of the voltage $V_{ref}$ and the time elapsed during the second period. When the output signal during the second or later period of rotation reaches a pre-determined level, a detector in the form of a comparison amplifier 38 produces an output which triggers a mono-stable multivibrator 40 which in turn energizes the marking solenoid 22.

By applying the voltage $V_{in}$ for a fixed period of rotation determined by engagement between the switch S1 and a cam up dwell 30a and applying the voltage $V_{ref}$ during a variable period occurring during engagement between the switch S1 and the cam down dwell 30b, the time elapsed during the later period of rotation at the time the voltage $V_2$ goes to zero is directly proportional to and thereby accurately reflects the magnitude of the input signal voltage. With the sweep of the helical element 12 and the drum 10 synchronized with the second period of rotation such that the helical element 12 begins to pass the marking bar 14 at the time the later period begins, energization of the solenoid 22 will result in the marking of the strip chart in a position indicating the magnitude of voltage $V_{in}$. After the helical element 12 has passed the marking bar 14 at the end of the second revolution, the switch S2 is closed by the cam 28 to discharge the capacitor 44. This returns the voltage $V_2$ to zero and readies the circuit for application of the voltage $V_{in}$ during the next revolution.

Before proceeding with a detailed description of the circuit shown in FIG. 2, the overall operation of that circuit in conjunction with the apparatus shown in FIG. 1 will now be described with reference to FIG. 2a.

Figure 2A:
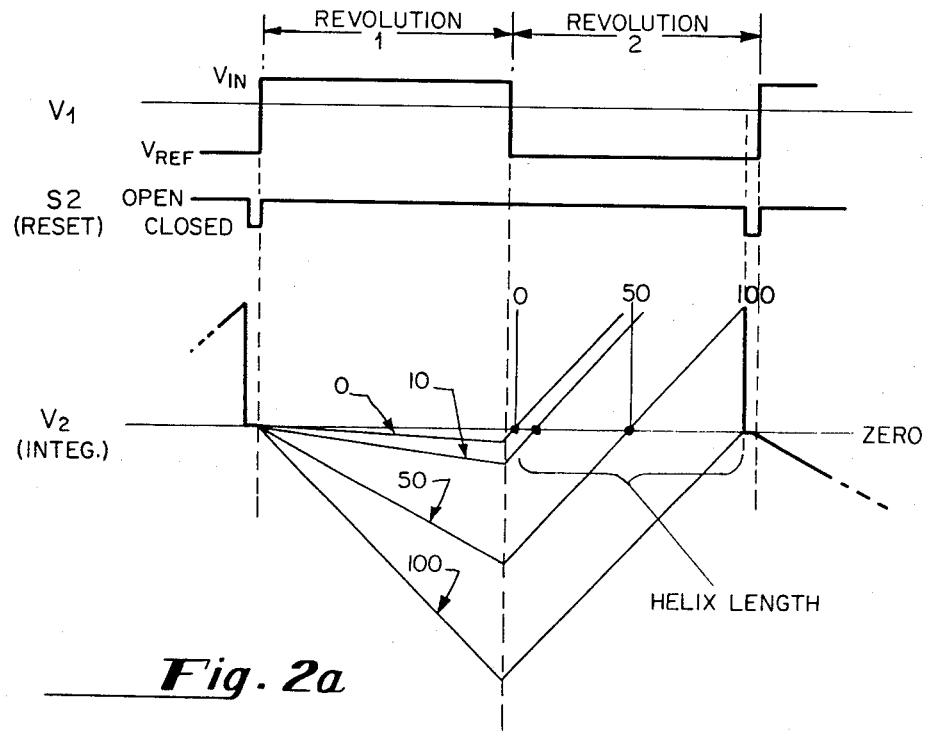
FIG. 2a is a waveform diagram which will be utilized in describing the operation of the circuitry shown in FIG. 2.

The first waveform $V_1$ which comprises the sampled input voltage $V_{in}$ and the reference voltage $V_{ref}$, as shown in FIG. 2a, represents the input voltage applied to the integrating amplifier 36. The second waveform shown in FIG. 2a represents the periodic closure of the switch S2 which serves to discharge the capacitor 44. The third waveform $V_2$ shown in FIG. 2a represents the output voltage from the integrating amplifier 36.

Before the first revolution of the drum 10, the switch S2 is closed momentarily by the cam 30 so as to discharge the capacitor 44. This discharging action is clearly shown in the $V_2$ waveform which indicates that the voltage across the capacitor rapidly drops from a relatively high voltage to approximately zero. The switch S2 is then opened up in response to the cam 30 and measurement of the input signal voltage $V_{in}$ begins when the switch S1 moves to position (a) shown in broken lines in FIG. 2 such that $V_1$ is equal to $V_{in}$. The switch S1 stays in this position throughout the first revolution of the drum so as to apply the voltage $V_{in}$ to the integrating amplifier 36 throughout a pre-determined or fixed period. Throughout this fixed period, the voltage $V_2$ grows more and more negative as the capacitor 44 charges to a level at the end of the first revolution which corresponds to the magnitude of the input signal.

The switch S1 then moves to the position (b) shown with a solid line such that the input voltage $V_{in}$ is equal to the reference signal voltage $V_{ref}$. The voltage $V_2$ now moves more toward zero during the second revolution. When the voltage $V_2$ does reach zero, the zero detector 38 will produce a signal to energize the solenoid coil 22. The voltage $V_2$ continues past the zero crossover point and charges to some positive value at the end of the second revolution, at which time the switch S2 closes again so as to discharge the capacitor 44 rendering the voltage $V_2$ equal to zero in preparation for another revolution of the drum.

Note that the sweep of the helix past the marking member 14 is synchronized with the movement of the switch S1 by appropriately positioning the cams 28 and 30 on the shaft 26. However, the helix does not begin to sweep past the marking bar 14 as soon as the switch S1 moves to the position shown in full in FIG. 2. Rather, the sweep of the helix past the marking bar 14 only represents about 90 percent of the drum revolution. The first 5 percent of drum revolution is utilized as start-up time and the last 5 percent of drum revolution is utilized for reset.

As clearly indicated by the various $V_2$ waveforms, the zero crossover point for the voltage $V_2$ will vary in time depending upon the magnitude of the input signal voltage $V_{in}$. Since the time of zero crossover is synchronized with the sweep of the helical element 12 past the marking bar 14, actuation of the marking bar 14 will produce a mark on the strip chart in a position which corresponds with the time of zero crossover which in turn corresponds with the magnitude of the input signal voltage $V_{in}$.

Since the drum speed for two consecutive revolutions of the drum is relatively constant regardless of variations in speed of the drum drive, the necessity for a constant speed drum drive is eliminated in accordance with one important object of the invention. Furthermore, since the same circuit elements are utilized during each revolution of the drum for comparison of the input voltage $V_{in}$ and the reference voltage $V_{ref}$, the component values of these circuit elements are not critical except for the constant value of the voltage $V_{ref}$.

The circuitry shown in FIG. 2 will now be described in somewhat more detail. An integrating amplifier 36 includes an operational amplifier 42 with the integrating capacitor 44 connected between the inverting input and the output of the amplifier 42 so as to be charged and discharged by the alternate application of the voltage $V_{in}$ and the voltage $V_{ref}$ as controlled by the switch S1. A resistor 46 is connected in series with the switch S2 to protect the switch contacts when the switch S2 is closed to discharge the capacitor 44.

The rate at which the capacitor 44 is charged and discharged is determined by the capacitor 44 in combination with a resistor 48 connecting the switch S1 to the inverting terminal of the operational amplifier 42. In order to provide zero adjustment, a variable resistor 50 is connected between the non-inverting terminal of the operational amplifier 42 circuit common where the zero adjustment circuit also includes a resistor 52 connected between the non-inverting terminal and the negative side of the reference supply voltage 32. The potentiometer 54, shown as connected between a +6 volt supply circuit and common in combination with a resistor 56 connecting the tap of the potentiometer 54 to the inverting terminal of the operational amplifier 42 provides the integrating amplifier with input stage bias current balancing.

As mentioned previously, the detector 38 determines the exact point in time at which the voltage on the capacitor 44 passes through zero during the second revolution of the drum. This function is accomplished by the operational amplifier 58 having a non-inverting terminal connected to the output of the integrating amplifier 36 and an inverting terminal connected to circuit common. As the charge on the capacitor 44 approaches zero, the output from the operational amplifier 58 is coupled to the monostable multivibrator 40 through the circuitry including a capacitor 60 and resistors 62 and 64 which provide an appropriate time constant. The transistors 66 and 68 of the multivibrator 40 then conduct momentarily to allow current to pass between the ±6 volt sources through the solenoid coil 22. A diode 70 is connected in shunt with the coil 22 in the usual manner for transient suppression.

The operational amplifiers 42 and 58 are powered by the ±6 volt sources in the usual manner. Capacitors 72 and 74, shown as connected between terminals of the operational amplifiers 42 and 58, limit the bandwidth.

A digital embodiment of the invention will now be described with reference to FIG. 3. As shown there, the storage function provided by the integrating amplifier 36, more particularly the capacitor 44, is now provided by a presetable counter 80 which is preset in response to the voltage $V_{in}$ as converted by an analog-to-digital converter 82. The counter 80 then counts down to zero or up to a full count in response to a reference signal in the form of the output from an oscillator 84 having a substantially constant frequency. During the first revolution of the drum 10, the switch S1 enables gates 86 so as to preset the counter 80. During the second revolution, the switch S1 which is connected to an inverter 88 enables a gate 90 so as to allow the count in the counter 80 to proceed, incrementing or decrementing. When the count in the counter 80 reaches zero, or a full count, the NOR gate 92 is enabled which in turn triggers the monostable multivibrator 40 which energizes the solenoid 22.

In order to avoid the necessity for an oscillator having a constant frequency, the oscillator 84 is also utilized to drive a motor 94 which in turn drives the drum 10. For this purpose, a divider 96 is provided between the oscillator 84 and the motor 94. It will of course be appreciated that a power amplifier of a type well known in the art will be needed so as to increase the power of the output from the divider 96 to a suitable level for use by the motor 94.

A hybrid analog-digital embodiment will now be described with reference to FIG. 4. As shown there, the storage function which was provided by the capacitor 44 in the embodiment of FIG. 2 is again provided by a counter, in this instance, an up/down counter 98. During the first revolution of the drum, the counter 98 counts up in response to the input voltage $V_{in}$ applied to a voltage frequency converter 100. During the second revolution, the up/down counter 98 counts down in response to the output from fixed frequency oscillator 102. The application of the output from the voltage frequency converter 100 to the up/down counter 98 is controlled by the switch S1 which enables a gate 104. Similarly, a gate 106 is enabled by a switch S1 which is coupled to an inverter 108 during the second revolution of the drum. When the count in the counter 98 reaches zero, the NOR gate 92 is enabled so as to trigger the multi-vibrator 40.

Figure 3:
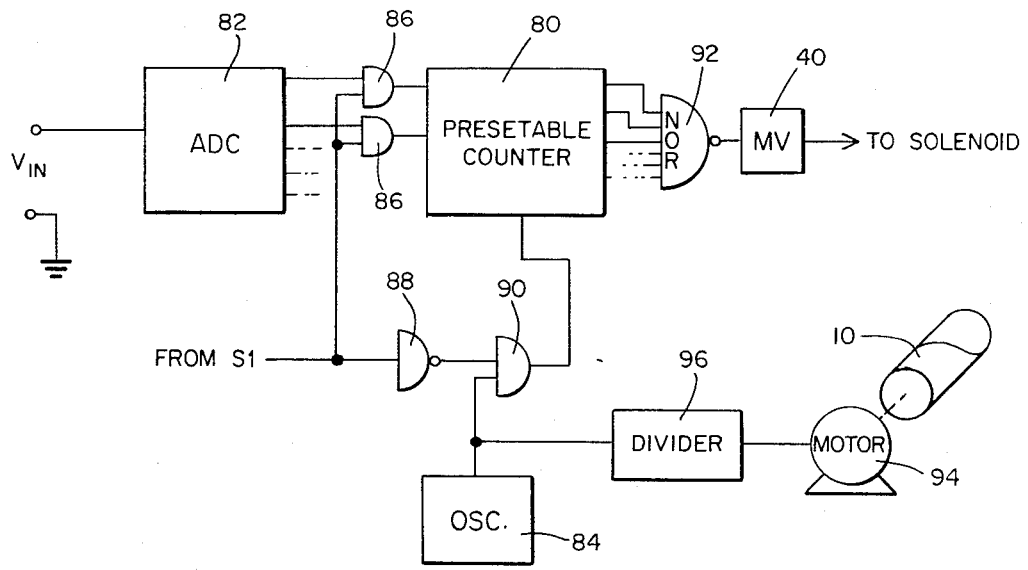
FIG. 3 is a schematic diagram of circuitry which is utilized in another embodiment of the invention.

The oscillator 84 again is utilized to drive the motor 94 as in the embodiment of FIG. 3. However, the motor 94 may be driven by an independent power source since any variation in the independent power source will not have any adverse effect due to the short time lapse between the first and second revolutions of the drum.

Figure 4:
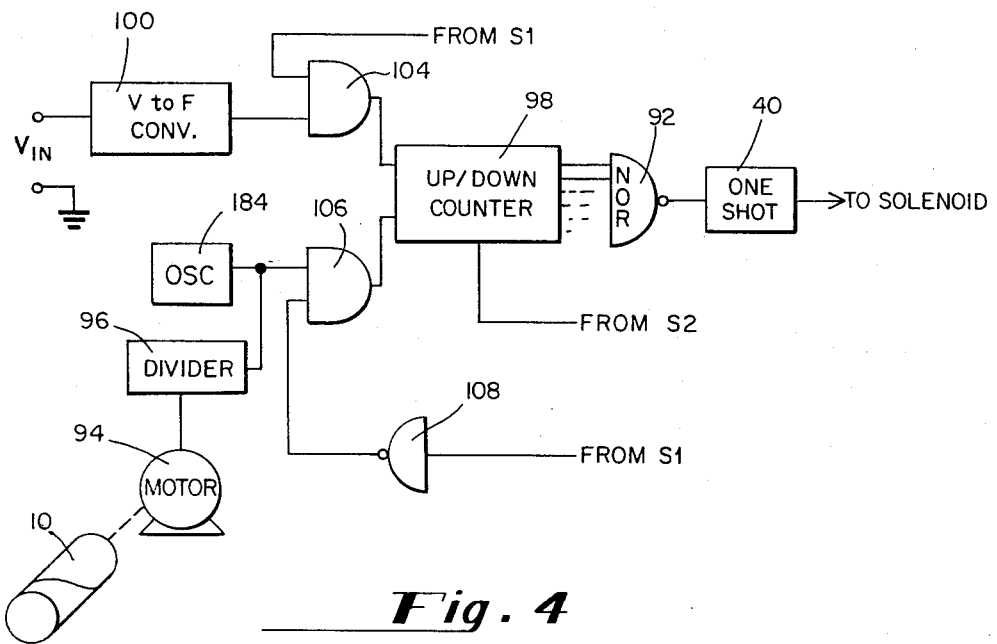
FIG. 4 is a schematic diagram of circuitry which is utilized in yet another embodiment of the invention.

In the embodiment of FIG. 4, the up/down counter 98 is reset to zero by the switch S2 of FIG. 1. In the embodiment of FIG. 3, the count in the counter 80 is preset regardless of the count remaining after the second revolution of the drum. The switch S2 is therefore not needed to reset the counter 80 to zero.

In the foregoing embodiments, the voltage $V_{in}$ is applied to the storage means during a first or earlier revolution of the drum while the voltage $V_{ref}$ is applied to the storage means during a second or later revolution of the drum. If the helical element 12 does not extend completely around the drum 10, it is of course possible to apply the voltage $V_{in}$ and the voltage $V_{ref}$ during the same revolution of the drum. In other words, the voltage $V_{in}$ can be applied to the storage means during a pre-determined or fixed period before the helical element 12 reaches the marking bar 14. The voltage $V_{ref}$ will continue to be applied to the storage means for a period coinciding with the time it takes for the helical element 12 to sweep past the marking element 14.

Throughout the foregoing discussion, it has been assumed that the voltage $V_{in}$ is applied to the storage means first and the voltage $V_{ref}$ is applied to the storage means last. This need not be the case. It is possible to apply the voltage $V_{ref}$ to the storage means for a pre-determined period of time and then apply the voltage $V_{in}$ to the storage means, detecting when the contents of the storage means reach a pre-determined level. Such an arrangement will however produce a nonlinear output which may be corrected by utilizing a helical element 12 which forms something other than a true helix. It might also be corrected by utilizing a marking bar 14 which forms something other than a straight line parallel with the axis of drum rotation.

Figure 5:
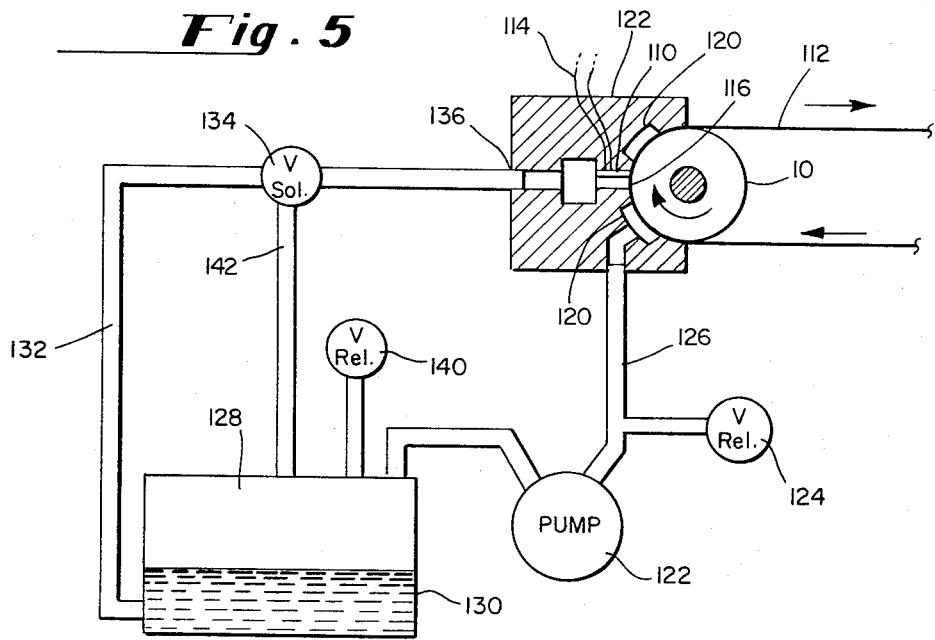
FIG. 5 is a schematic diagram of another marking mechanism which may be utilized in a helical drum recorder embodying the invention.

In regard to the marking bar 14 and the actuating solenoid 22, it should be appreciated that a different marking mechanism may be utilized. In FIG. 5, a marking mechanism which is particularly well suited for use in a helical drum recorder comprises a stylus which extends into a position of near contact with a dielectic strip chart 112. By energizing the stylus 110 through leads 114, a latent charge is deposited on the strip chart 112 at a point coinciding with the intersection of a curved or helical electrode (not shown) carried by the drum 10. By providing an electrographic toner flow path between a discharge port 116 and a vacuum port 120, charged particles of the toner fluid are attracted to the latent charge so as to provide a visible mark on the strip chart at that point. Since the details of an electrographic system of this type are set forth in detail in copending application Ser. No. 270,327 filed July 10, 1972, incorporated herein by reference, the system will be only briefly described.

As shown in FIG. 5, a pump 122 is provided which reduces the pressure at vacuum ports or chambers 120. Air entering by leakage into the vacuum chamber 12 and inwardly through a suction valve 124 is pumped via a vacuum line 126 into an air space 128 at the top of a toner reservoir 130. This pressure head drives toner fluid out of the bottom of the reservoir 130 via a feed line 132 through a solenoid valve 134 and into the toner inlet port 136. The resulting flow is then collected in a supply manifold 138 which distributes toner uniformly to the toner discharge port 116. The removal of excess toner in the vacuum chambers 120 now produces a mixture of air and toner pumped into the air space 128 of the reservoir 130 where the mixture is separated. A pressure relief valve 140 prevents excessive air pressure build-up during continuous operation. For proper shut-down of the imaging system, the solenoid valve 134 in the toner feed line 132 vents a line 142 to the air space 128 of the toner reservoir 130. With the toner feed thus interrupted, the pump 122 is allowed to remain running for a short period in order to purge the imaging head of any remaining toner fluid.

The foregoing specification uses the phrase "helical marking element." It will of course be understood that the marking element may not form a helix in the strict sense of the word.

Referring again to FIG. 1, it will be seen that the motor 16 and the circuitry 20 are supplied by a power source 110 through a timing switch 112. The purpose of the switch 112 is to periodically activate the recorder. This may be particularly desirable where the power source 110 comprises a battery and continuous operation of the recorder would represent an excessive power drain. A reset line 114 which connects the timing switch 112 to the switch S2 is provided. This permits the timing switch 112 to close the switch S2 during the start-up of each marking interval so as to prevent erroneous marking in the embodiments of FIGS. 2 and 4.

In the foregoing, various embodiments have been described in detail and various modifications in these embodiments have been suggested. It will be understood that other embodiments and modifications which will be obvious to those of ordinary skill in the art may be made without departing from the spirit and scope of the invention as set forth in the appended claims.

What is claimed:

1. Apparatus for recording an input signal on a strip chart comprising:
   a drum having a helical element extending along the surface thereof concentric with the axis of said drum, said drum adapted to rotate about said axis as one side of a strip chart moves relative to said drum in a direction perpendicular to the motion of said strip chart;
   marking means extending across said strip chart on the other side thereof so as to cooperate with said helical element on said drum in marking on said strip chart when said marking means is energized;
   drive means for rotating said drum;
   means for establishing periods of rotation synchronized with rotation of said helical element past said marking means;
   means for generating a reference signal;
   means for generating one signal during one of said periods representing a function of said input signal and the time elapsed during one of said periods;
   means for generating another signal during another of said periods representing a function of said reference signal and the time elasped during another of said periods;
   means for terminating the earlier of said periods after a pre-determined time has elapsed;
   means for detecting when sufficient time has elapsed during the later of said periods so as to establish a pre-determined relationship between said one signal at the end of said earlier period and said other signal; and
   means operable in response to said detecting means for energizing said marking means when said pre-determined relationship has been established.

2. The apparatus of claim 1 wherein
   said means for generating said reference signal comprises a DC source generating a DC reference signal; and
   said means for generating said one signal and said other signal comprises means for generating said other signal comprises integrating amplifier means, said input signal and said reference signal being alternately coupled to the input of said amplifier means during said periods of rotation, said detecting means sensing when the output of said integrating amplifier means reaches a pre-determined reference level during the later of said periods of rotation.

3. The apparatus of claim 1 wherein
   said means for generating said reference signal comprises an oscillator means for generating a reference signal of substantially constant frequency during periods of rotation adjacent in time; and
   said means for generating said one signal and said means for generating said other signal comprises counter means, said apparatus further comprising:
   means for modifying said input signal before application to said counter means, said modified input signal and said reference signal being alternately coupled to said counter means during said periods of rotation, said detecting means sensing when the output of said counter means reaches a predetermined level during the later of said periods of rotation.

4. The apparatus of claim 3 wherein said counter means comprises a pre-settable counter and said means for modifying said input signal comprises an analog-to-digital converter, said counter being pre-set in response to the output of said analog-to-digital converter and counting in response to said reference signal.

5. The apparatus of claim 3 wherein said counter means comprises an up/down counter and said means for modifying said input signal comprises a voltage-to-frequency converter, said counter counting in one direction in response to the output of said voltage-to-frequency converter and counting in the opposite direction in response to said reference signal.

6. Apparatus for recording an analog input signal on a strip chart comprising:
a drum having a helical line extending along the surface thereof concentric with the axis of said drum, said drum adapted to rotate about said axis as one side of a strip chart moves relative to said drum in a direction perpendicular to the direction of motion of said strip chart;
drive means for rotating said drum;
marking means extending across said strip chart on the other side thereof so as to cooperate with said helical line on said drum in marking on said strip chart when said marking means is energized;
means for generating a reference signal;
means for generating a first signal after a fixed period of drum rotation directly related to said input signal and the time elapsed during said fixed period of rotation;
means for generating a second signal during a subsequent period of drum rotation synchronized with rotation of said helical line past said marking means, said second signal directly related to said reference signal and the time elapsed during said subsequent period;
means for detecting when sufficient time has elapsed during said other period so as to establish a pre-determined relationship between said first signal and said second signal; and
means operable in response to said detecting means for energizing said marking means when said pre-determined relationship has been established.

7. The apparatus of claim 6 wherein said helical line comprises a helix and said marking means extends along a straight line substantially parallel to said drum axis.

8. The apparatus of claim 6 wherein said fixed period of rotation occurs during one revolution of said drum and said subsequent period of drum rotation occurs during the next revolution of said drum.

9. The apparatus of claim 6 wherein said subsequent period is initiated as said helical line begins to pass said marking means.

10. The apparatus of claim 7 wherein said marking means is of the electrographic type comprising:
a reservoir means containing said liquid toner;
a discharge path for applying said liquid toner to a record receiving medium; and
an elongated stylus extending across said strip chart for applying said latent electrostatic record to said record receiving medium, said stylus being located within the liquid toner flow path from said discharge port.

11. The apparatus of claim 10 further comprising a vacuum port adjacent said discharge port, said toner flow path extending from said discharge port to said vacuum port.

12. Apparatus for recording an analog input signal on a strip chart comprising:
a drum having a helical line extending along the surface thereof concentric with the axis of said drum, said drum adapted to rotate about said axis as one side of a strip chart moves relative to said drum in a direction perpendicular to the direction of motion of said strip chart;
marking means extending across said strip chart on the other side thereof so as to cooperate with said helical line on said drum in marking on said strip chart when said marking means is energized;
drive means for rotating said drum;
means for generating a reference signal;
storage means responsive to said input signal and said reference signal for producing an output signal directly related to the difference between the magnitudes of said input signal and said reference signal and directly related to the differences between the periods of time said input signal and said reference signal are applied to said storage means;
means for coupling said input signal and said reference signal to said storage means during respective periods of drum rotation, the first of said respective periods having a fixed duration, the second of said respective periods being synchronized with rotation of said helical line past said marking means;
means for detecting when said output signal reaches a pre-determined value during the second of said respective periods; and
means operable in response to said detecting means for energizing said marking means.

13. The apparatus of claim 12 wherein said means for generating said reference signal comprises a DC source generating a DC reference signal; said storage means comprising integrating amplifier means; and said means for applying said input signal and said reference signal to said storage means comprising switch means alternately applying said input signal and said reference signal during said respective periods, said detecting means sensing when said output signal from said integrating amplifier means reaches a pre-determined value during the second of respective periods.

14. The apparatus of claim 13 wherein said switch means applies said input signal to said integrating amplifier means during said first of said respective periods and applies said DC reference signal to said integrating amplifier means during the second of said respective periods.

15. The apparatus of claim 12 wherein said means for generating said reference signal comprises an oscillator;
said storage means comprises counter means; and
said means for coupling said input signal and said reference signal to said storage means comprises converter means for modifying said modified input signal and said reference signal to said storage means during respective periods of drum rotation.

16. The apparatus of claim 15 wherein said register means comprises a pre-settable counter and said means for modifying said input signal comprises an analog-to-digital converter, said gate means applying the output of said analog-to-digital converter during the first of said respective periods for pre-setting said counter and applying said reference signal of substantially constant frequency during the second of said respective periods until said pre-settable counter reaches a pre-determined value as determined by said detecting means.

17. The apparatus of claim 15 wherein said counter means comprises an up/down counter and said means for modifying said input signal comprises a voltage-to-frequency converter, said gate means applying the output of said voltage-to-frequency converter to an input of said up/down counter during the first of said respective periods so as to produce an increasing count during the first of said respective periods and applying said reference signal of substantially constant frequency to another input of said up/down counter during the second of said respective periods so as to produce a decreasing count until said count reaches a pre-determined value as determined by said detecting means.

18. Apparatus for recording an analog input signal on a strip chart comprising:
a drum having a helical line extending along the surface thereof concentric with the axis of said drum, said drum adapted to rotate about said axis as one side of a strip chart moves relative to said drum in a direction perpendicular to the direction of motion of said strip chart;
marking means extending across said strip chart on the other side thereof so as to cooperate with said curved line on said drum in marking on said strip chart when said marking means is energized;
drive means for rotating said drum;
means for generating a reference signal;
storage means responsive to said input signal and said reference signal for producing an output signal directly relative to the difference between the magnitudes of said input signal and said reference signal and directly related to the differences between the periods of time said input signal and said reference signal are applied to said storage means;
means for coupling said input signal and said reference signal to said storage means during respective periods of drum rotation, the first of said respective periods having a fixed duration, the second of said respective periods being synchronized with rotation of said curved line past said marking means;
means for detecting when said output signal reaches a pre-determined value during the second of said respective periods;
means operable in response to said detecting means for energizing said marking means;
power supply means; and
switch means coupled to the output of said power supply means for periodically supplying power to said drive means, said storage means, said detecting means and said means for energizing said marking means.

19. The apparatus of claim 18 including reset means for resetting said storage means, said switch means being coupled to said reset means for periodically actuating said switch means when rotation of said drum is initiated.

* * * * *